United States Patent [19]
Lechevallier et al.

[11] 4,287,045
[45] Sep. 1, 1981

[54] COOLED ELECTRODE ADAPTED TO CONTACT MOLTEN METAL

[75] Inventors: Christian Lechevallier; Jacques Cordier; Martine Antoine, all of Metz, France

[73] Assignee: Institut de Recherches de la Sidérurgie Française, Saint-Germain-en-Laye, France

[21] Appl. No.: 93,710

[22] Filed: Nov. 13, 1979

[30] Foreign Application Priority Data
Nov. 10, 1978 [FR] France .................. 78 32.208

[51] Int. Cl.³ .............. C25C 7/02; C25C 7/00; H05B 7/08
[52] U.S. Cl. .............. 204/243 R; 204/274; 204/286; 13/18 R
[58] Field of Search .......... 204/64 R, 60, 243 R–247, 204/274, 286, 68; 13/18 A, 18 R, 6

[56] References Cited

U.S. PATENT DOCUMENTS

| | | | |
|---|---|---|---|
| 2,908,738 | 10/1959 | Rough | 13/6 X |
| 3,380,907 | 4/1968 | Wurm | 204/245 X |
| 3,580,835 | 5/1971 | Peterson | 204/245 X |
| 3,589,988 | 6/1971 | Winand | 204/64 R |
| 3,637,468 | 1/1972 | Icxi | 204/274 X |
| 3,745,107 | 7/1973 | Jacobs | 204/243 X |
| 3,776,823 | 12/1973 | Crowther | 204/68 X |
| 4,101,725 | 8/1978 | Shelepov et al. | 13/18 |

FOREIGN PATENT DOCUMENTS

2054750  5/1971  France ................................. 13/6
2292397  6/1976  France .

*Primary Examiner*—Donald R. Valentine
*Attorney, Agent, or Firm*—Michael J. Striker

[57] ABSTRACT

An electrode, especially for use in metallurgical furnaces or the like containing a bath of molten material which extends through and outwardly beyond the furnace wall while its inner end is in contact with the bath of molten material. A cooling device, in form of a heat pipe, extends centrally through the electrode nearly up to the inner end of the latter and carrying at its outer end projecting beyond the outer end of the electrode a heat exchange device. The electrode includes at its inner end an arrangement for reducing heat convection from the molten material to the electrode.

7 Claims, 1 Drawing Figure

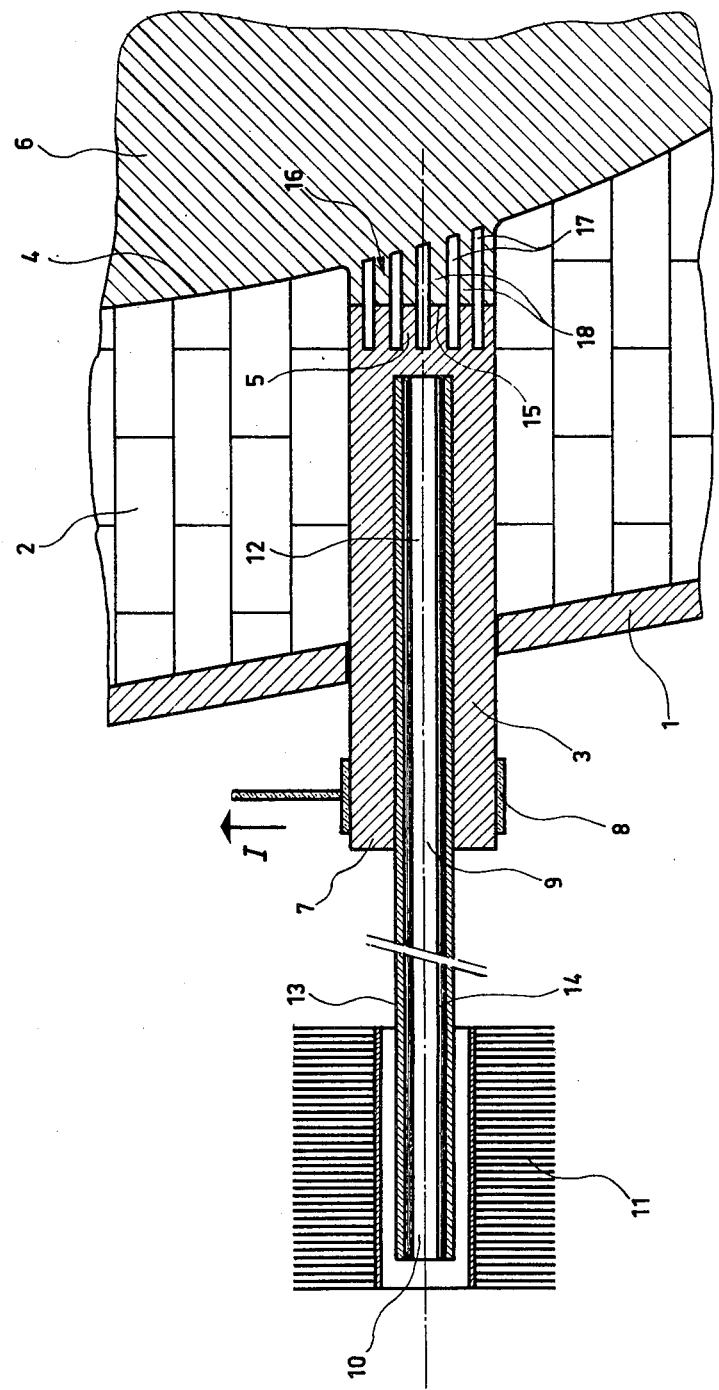

COOLED ELECTRODE ADAPTED TO CONTACT MOLTEN METAL

BACKGROUND OF THE INVENTION

The present invention relates to an electrical connection device destined to be brought into contact with molten metal, for instance a bath of molten steel. Such devices are usually embedded in a metallurgical container with the purpose of continuously treating the metal therein by means of electrical energy. Such devices constitute, therefore, electrodes in contact at one end with a bath of molten material and assuring thereby the passage of an electric current which traverses the metal bath.

Among the metallurgical containers which are adapted to be equipped with such electrode, there are mentioned, in a non-restrictive way, tubs for the electrolysis of non-ferrous material, such as aluminum, or, in the field of treatment of ferrous metals treating containers to be maintained at a high temperature, or electrical furnaces, especially arc furnaces operated with direct current, and in the technical field somehow different from those mentioned, furnaces for heating and melting of glass.

One of the main problems encountered with such electrodes is the proper maintenance of its end portion which is in direct contact with the mass of molten metal and which is subjected at very high temperatures which, especially in the case of molten steel, may reach a temperature of 1800° C. and even higher.

Certain of the known solutions for overcoming these problems consist in a modification of the geometry of the container of the furnace in such a manner to create locally a preferred location for the insertion of the electrode, in which the mass of molten metal is considerably less thermally aggressive than at the rest of the furnace (French Pat. Nos. 2,168,430, 2,276,388 and 2,285,044). However, these solutions require the permanent presence of a special formation of a bottom portion of the metal bath, which places certain restrictions on the use of the furnace.

Other known solutions prefer to place the electrode directly across the refractory wall at the bottom of the furnace and concentrate their effort in the cooling of the electrode. In this respect one may distinguish between constructions in which the electrode is equipped with an external or an internal cooling circuit. In the first case, for the reason of security, the cooling circuit is usually not placed in the refractory material at the bottom of the furnace, but at the outside of the furnace (French Pat. Nos. 1,538,996 and 2,292,367). However, the distance of the tip of the electrode from the cooling source is in this case the cause of the final disappearance, by melting, of an important part of the electrode, which increases the danger that the mass of molten material in the interior of the furnace may escape therefrom.

An external cooling system has also been already proposed which consists to form a protecting envelope about the electrode by means of a cooling fluid. The electrode is in this case not any longer in direct contact with the mass of molten material, which limits the choice of cooling fluid to one which consists of an electroconductive material.

The second above-mentioned case, to which also the present invention relates, is free of such restrictions since it is in this case possible to lead the cooling fluid directly to the neighborhood of the inner end of the electrode. Nevertheless, it is in this case highly desirable, and this is the aim of the present invention, to use cooling means of high performance. In the other case even a reduced wear at the inner end of the electrode entails the risk of destroying the refrigeration system by opening it up, which in turn may cause the introduction of the cooling fluid into the mass of molten material.

SUMMARY OF THE INVENTION

It is, therefore, an object of the present invention to properly cool the end portion of an electrode which is in contact with the hot molten material to substantially prevent any wear of this end portion and the danger of passing the cooling fluid into the mass of molten material.

With these and other objects in view, which will become apparent as the description proceeds, the present invention relates to an electrode embedded with an inner portion thereof in the wall of a furnace containing a bath of molten material so that the inner end of the electrode is in contact therewith, whereas an outer end portion of the electrode projects beyond the furnace wall. The present invention provides also for means for cooling the electrode and these means extend longitudinally partly through the electrode and having an inner end adjacent the inner end of the electrode and an outer end portion projecting beyond that of the electrode. These cooling means comprise a heat exchange system functioning as a heat siphon circulating a fluid through a closed circuit between a vaporization zone in inner portion of the electrode and a condensation zone at the outer end portion of the cooling means.

The cooling means are constituted by so called "heat pipe" extending coaxially through the interior of the electrode and having one end adjacent the inner end of the electrode and projecting with an end portion opposite the one end beyond the outer end of the electrode.

According to a preferred arrangement, which improves the evacuation of heat towards the exterior, the outer end portion of the heat pipe carries a heat exchanger. According to a further advantageous feature of the invention and complimenting the arrangement mentioned above, is an arrangement which permits to limit the heating of the electrode at the inner end adapted to be in contact with the mass of molten material and this arrangement includes a plurality of refractory elements connected to the inner end of the electrode and extending parallel to each other and in the longitudinal direction of the electrode reducing the heat convection of the mass of molten material in the neighborhood of the inner end of the electrode to the latter.

The principle of a "heat pipe" is well known and does not form part of the present invention and is, therefore, not described in detail. A description of the principle of the "heat pipe" may be found in various documents, among which there are the French Pat. Nos. 2,241,052 and 2,217,653 as well as an article of Mr. Y. Martinet which appeared in the Revue Generale Thermique Francaise, No. 192. December 1977, pages 865 to 880, and U.S. Pat. Nos. 3,865,184 and 3,753,364.

Here it is mentioned only that the "heat pipe" is a thermosiphon of vaporization constituted by a reservoir of good heat conducting quality and forming a closed circuit the interior wall of which is lined with a metallic mesh constituting a capillary structure which contains a substance called "heat carrier", the nature and quantity of which is chosen in such a manner that under desirable operating conditions it will be in a state of equilibrium of liquid and vapor in which the liquid phase saturates at least the capillary structure. The "heat pipe" will function according to the principle that, when one extremity is heated, the heat carrier which is in a zone of vaporization is converted into vapor and flows naturally in the direction of drop of the temperature toward the other end of the "heat pipe" which is cooled, for example by a heat exchanger. The heat of evaporation is liberated as the vapor condenses at the cool extremity of the "heat pipe" (zone of condensation) and the capillary forces will again lead the condensed liquid through the peripheral capillary structure towards the zone of evaporation. Thus a continuous cycle of evaporation-condensation is established producing a transfer of energy which does not require any outside mechanical support. Such "heat pipes" find various applications in various technical endeavors such as in isotherm furnaces, air conditioning systems, freezing tubes of medical use, heat supply arrangements, etc.

As understood, the present invention resides, in its essential characteristics, in the new use of a "heat pipe" as a means of cooling an electrode which at one of its ends is in contact with a molten metal, and more precisely, the use of the "heat pipe" as an especially effective thermal bridge since it will act like a solid heat conductive body of a heat conductivity which is more than 100 times greater than that of copper. This thermal bridge is established between the hottest terminal portion of the electrode and the cooling source, thus permitting to perfectly cool the terminal end of the electrode, while maintaining the outer end at the exterior of the furnace properly cooled. This novel use of the "heat pipe" provides an effective solution for the problem of cooling an electrode since the cooling source, constituted by heat exchanger at the outer extremity of the "heat pipe" is not only at the exterior of the furnace, but its elongation is likewise of importance. It is known that the thermic resistance of the "heat pipe" is independent of the total length of the apparatus and thus the heat pipe, compared with other means of transporting heat, is all the more interesting as its length increases.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE illustrates a longitudinal section through an electrode at the bottom of an arc furnace equipped with cooling means in form of a "heat pipe".

DESCRIPTION OF THE PREFERRED EMBODIMENT

The drawing illustrates in part the bottom portion of an arc furnace having an outer metallic cover 1 and a lining of refractory material 2 with an electrode 3 passing through the cover 1 and the refractory lining 2.

The electrode 3 has an inner end portion 5 in contact with the bath of molten metal 6 at the bottom of the furnace and an outer end portion 7 encompassed by a collar 8 of copper for the backflow of electric current in the direction as indicated by the arrow toward a supply of electric energy, not illustrated.

The body of the electrode 3 is provided with an axial bore extending into close vicinity of the end portion 5 in such a manner to provide a casing for a cooling system in form of a "heat pipe" which will now be described. The "heat pipe" 9 is in the form of an elongated hollow cylinder of a length greater than that of the electrode 3. The free end portion 10 of the "heat pipe" which extends beyond the electrode carries a heat exchanger 11. The type of heat exchanger used is not of special importance. The heat exchanger may be, as illustrated in the drawing, a fin type heat exchanger and the cooling may be accomplished simply by the surrounding air. On the other hand, the cooling means could be a forced cooling system using a liquid or gaseous cooling medium. The portion 12 of the "heat pipe" 9 which is surrounded by the electrode 3, and especially the portion thereof in the neighborhood of the inner end 5 of the electrode, constitutes the evaporation zone and the outer free portion 10 surrounded by the heat exchanger 11 constitute the condensation zone. Taking into consideration that the temperature residing in the region of the inner end of the electrode is in the order of 500° C.–700° C. the heat carrying fluid may be mercury, potassium or sodium, preferably mercury is used. In this case the envelope 13 of the "heat pipe" as well as the capillary structure in the interior thereof, for instance a wire mesh 14, are formed from an alloy of stainless steel with magnesium and titanium. The electrode 3 may be fromed from a single material, for instance steel or copper. Preferably, it is of composite structure, its end portion 5 is formed of steel in order to better resist thermal agression by the molten metal 6, and the remainder of the body of the electrode in which the "heat pipe" is incorporated is formed from copper or other material providing good conductivity of heat and electricity.

It should be noted that a melting of the inner end of the electrode 3 cannot be totally avoided. But such melting takes place only mementarily during an initial transition period at the start of the operation which is followed by permanent phase corresponding to a stabilization of the end face 15 of the electrode.

Studies have shown that the heating up of the end portion 5 of the electrode in contact with the molten metal 6 is essentially by heat convection. Any means counteracting the heat convection of the liquid metal 6 in the region of the front surface 15 of the electrode will therefore contribute to the reduction of heating this end portion. Such means may for instance consist in the formation of a natural liquid well 16 due to the temporary melting at the end portion of the electrode. But this phenomenon is not of great importance due to the usually small depth of the well 16 as compared to the diameter and especially since it is usually desired to limit the maximum initial melting of the end portion of the electrode in order to maintain its front surface 15 as close as possible to the inner surface 4 of the refractory lining.

According to a further feature of the present invention, means are provided at the end face 5 of the electrode in order to locally limit the movement of convection of the molten metal. As shown in the drawing, one way of realizing such means consists to provide at the end portion 5 of the electrode a plurality of transversely spaced bars or platelets 17 of refractory material, advantageously of the same material as the refractory lining 2 at the bottom of the furnace, which extend toward the molten bath of metal 6. These bars or platelets 17 define between themselves long and narrow spaces 18 essentially reducing the development of heat convection from the mass of molten material to the electrode. In a new electrode these platelets 17 may in their entirety be incorporated in the end portion 5 of the electrode and the spaces 18 between the platelets 17 will occur during the use of the electrode due to the partially initial melting of its end portion. If necessary, it is possible to expedite the formation of the spaces 18 by initially filling the same with a material, such as cardboard, which is easily destroyed by contact with the mass of molten metal.

It will be understood that each of the elements described above, or two or more together, may also find a useful application in other types of cooled electrodes having an end portion in contact with a mass of molten material, differing from the types described above.

While the invention has been illustrated and described as embodied in a cooled electrode for use in the bottom of an arc furnace, it is not intended to to limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. For use in a metallurgical furnace or the like containing a bath of molten material a combination comprising an electrode embedded over a first portion thereof in the wall of the furnace and having an inner end adapted to be in contact with the molten material and an outer end portion projecting beyond the furnace wall; means for cooling the electrode consisting of a heat pipe including a tubular member extending longitudinally partly through the electrode and having a closed inner end adjacent said inner end of said electrode and an outer end portion projecting beyond that of said electrode and provided with a closed outer end, a capillary structure on an inner surface of said tubular element, and an evaporable heat carrier in said element and subject to evaporation adjacent said inner end and to condensation adjacent to said outer end, so that a continuous closed heat-syphoning circuit is established; and electrical conductor means connected to the outer end portion of said electrode.

2. A combination as defined in claim 1, and including heat exchange means connected to said outer end portion of said heat pipe for cooling said outer end portion by an external surrounding medium.

3. For use in a metallurgical furnace or the like containing a bath of molten material, a combination comprising an electrode embedded over a first portion thereof in a wall of the furnace and having an inner end adapted to be in contact with the molten material and an outer end portion projecting beyond the furnace wall; means for cooling the electrode consisting of a heat pipe extending longitudinally partly through said electrode and having a closed inner end adjacent to said inner end of said electrode and a closed outer end portion projecting beyond that of said electrode; means for establishing in said heat pipe a continuous closed heat-cycling circuit adapted to have an evaporable heat carrier traveling between said inner end and said outer end portion; means at said inner end of said electrode to reduce heat convection from the molten material in contact with said inner end of said electrode to the latter; and electrical conductor means connected to said outer end portion of said electrode.

4. A combination as defined in claim 3, wherein said heat convection reducing means are constituted by a plurality of elements of refractory material extending parallel to each other in the longitudinal direction of the electrode from the inner end of the latter.

5. A combination as defined in claim 3, wherein said heat convection reducing means comprises a plurality of elements of refractory material arranged parallel to each other in the longitudinal direction of the electrode, said elements are embedded in their entirety in the electrode in the region of the inner end thereof.

6. A combination as defined in claim 5, wherein said elements are in the region of said inner end of said electrode separated from each other by a material which will be quickly destroyed by contact with the molten material.

7. A combination as defined in claim 6, wherein said material is constituted by cardboard.

* * * * *